Patented July 10, 1928.

1,676,281

UNITED STATES PATENT OFFICE.

IWAN OSTROMISLENSKY, OF NEW YORK, N. Y., ASSIGNOR TO THE NAUGATUCK CHEMICAL COMPANY, OF NAUGATUCK, CONNECTICUT, A CORPORATION OF CONNECTICUT.

PROCESS FOR MAKING POWDERED VITREOUS POLYMERIZED STYROL AND ITS HOMOLOGUES, TO THE POWDER SO PRODUCED, AND ARTICLES INCLUDING SUCH MATERIAL.

No Drawing.    Application filed May 7, 1924.    Serial No. 711,586.

This invention relates to a process for making powdered vitreous polymerized styrol and its homologues; to the powder so produced; and articles including such material.

The principal objects of the invention are to provide a simple, rapid process of the kind described which shall obviate the necessity for use of expensive grinding machinery; to provide an efficient process for making emulsions of styrol and its homologues either in polymerized or unpolymerized condition; and to provide a series of products having a high degree of purity and which may be readily combined with other substances to produce substantially homogeneous mixtures.

The invention accordingly comprises a process for making powdered vitreous polymerized stryol and its homologues which includes polymerizing $Ar.CH:CH_2$ in an emulsion, and precipitating the polymerized $Ar.CH:CH_2$ as a powdery mass. In the formula Ar. stands for aryl. It also includes a process for making an emulsion of styrol which comprises combining therewith water and a salt of a fatty acid which may be added as its components, and mixing the combination until emulsified. It also includes powdered vitreous polymerized styrol and its homologues precipitated from dispersions thereof.

The terms "vitreous polymerized styrol" and "vitreous polymerized $ArCH:CH_2$," as used herein are intended to include that polymerized styrol and that polymerized $ArCH:CH_2$ which are tough and transparent and which may be practically colorless. They also show a dull fracture and may be cut with a knife to form thin films or parings. The terms exclude the brittle easily pulverized products which show a bright sharply defined fracture, which have a generally brownish color and a lower melting point than the vitreous type, and which when cut with a knife chip or crumble. These properties of the tough vitreous polymer are exhibited by the powdered products of the present invention except that the products are in finely divided form. In other words the production of the powdered polymerized styrol and powdered polymerized $ArCH:CH_2$ does not remove these characteristic properties. The term "vitreous" as used herein is intended to describe this tough modification and to exclude the brittle easily powdered modification.

In carrying out the invention in its preferred form, 33⅓ grams of substantially pure styrol are emulsified by stirring with 66⅔ grams of aqueous ammonia, specific gravity approximately 0.959, and 1 gram of oleic acid. Stirring is continued, 10 to 20 minutes, at the end of which time an emulsion of the styrol occurs. The resulting emulsion is heated preferably in an airtight container to 140° C. for 12 to 24 hours. During the first hour of heating the mixture should be stirred several times (say three) otherwise there is danger of the emulsion partially breaking. As a result of this treatment a very mobile milky liquid is produced which closely resembles rubber latex and contains finely divided vitreous polymerized styrol suspended or dispersed in a non-solvent containing the reaction product of the ammonia and the oleic acid. To this suspension is then added 800 cc. of methyl alcohol (95%) in which the polymerized styrol is substantially insoluble, and there then is precipitated as a very fine snow-white dust vitreous polymerized styrol containing a small amount, from .01 to .5%, of the reaction product of ammonia and oleic acid. This material is then filtered and carefully washed first with hot water and then with small amount of methyl or ethyl alcohol or similar material, after which it is dried in any convenient manner such as by air heated to a low temperature or otherwise as desired.

Various other materials may be used as emulsifying agents instead of oleic acid. For example palmitic, stearic and similar soap-forming fatty acids may be so employed, and these materials will appear in small amounts in the resulting products. These materials may be added in amounts varying from 1-10% approximately. The temperature for polymerizing may be varied within the limits 130° to 175° C. and the time may be correspondingly varied from 90 to 10 hours. Instead of using methyl alcohol, ethyl alcohol or acetone may also be used as well as sulphuric or acetic acid or barium chloride solution, preferably containing about 1% barium chloride.

In general it may be said that all coagulating agents for rubber latex have this effect and may be used. Indeed the dispersion resembles rubber latex in many respects.

Various other substances, for example, those soluble or readily dispersed by water, as for example, gelatine, gum arabic, starch, agar agar, etc., may be mixed with the dispersion of polymerized styrol. Such combinations may be coagulated in a manner similar to that mentioned for the coagulation of the uncombined dispersion, and thus give homogeneous mixtures of vitreous polymerized styrol and gelatine, etc., in precipitated form.

The products of the coagulation of such polymerized dispersions are dried either at ordinary temperatures or at elevated temperatures, with or without a vacuum and molded in a plunger mold at temperatures between 120–175° C. as described in copending application of Ostromislensky and Shepard, Serial No. 711,588, filed May 7, 1924.

The emulsified and powdered products may be readily mixed with various other powdered materials for example pigments such as zinc oxide, cadmium sulphide, mercury sulphide, etc., to form homogeneous mixtures.

For example 100 grams of the coagulated and dried vitreous polymerized styrol powder are mixed in a mortar with 15 grams of zinc oxide and then molded as above.

Instead of employing styrol as the material to be emulsified and polymerized, various other materials and their homologues may be employed with similar results. Such homologues include ortho- and paramethylstyrol, symmetrical meta-meta-dimethylstyrol, etc.

As many apparently widely different embodiments of this invention may be made without departing from the spirit thereof, it will be understood that I do not intend to limit myself to the specific embodiments herein set forth except as indicated in the appended claims.

Having thus described my invention what I claim and desire to protect by Letters Patent is:—

1. The process for making powdered vitreous polymerized $ArCH:CH_2$ where Ar represents aryl which comprises polymerizing $ArCH:CH_2$ in an emulsion, to form vitreous polymerized $ArCH:CH_2$, and precipitating the polymerized $ArCH:CH_2$ as a powdery mass.

2. The process for making powdered vitreous polymerized $ArCH:CH_2$ where Ar represents aryl which comprises polymerizing $ArCH:CH_2$ in an emulsion at 130° C.–175° C., until a vitreous polymerized $ArCH:CH_2$ is formed, and precipitating $ArCH:CH_2$ as a powdery mass.

3. A process for making powdered vitreous polymerized $ArCH:CH_2$, where Ar represents aryl, which comprises polymerizing the $ArCH:CH_2$ in an emulsion at approximately 130° C. to 175° C. for 90–10 hrs., until a vitreous polymerized $ArCH:CH_2$ is formed, and adding thereto a substance adapted to precipitate the polymerized $ArCH:CH_2$ as a powdery mass.

4. A process for making powdered vitreous polymerized styrols which comprises combining unpolymerized styrols with an emulsion-forming fatty acid soap to form an emulsion, polymerizing the styrols therein to the vitreous modification, and precipitating the polymerized material as a powder.

5. A process for making powdered vitreous polymerized styrol which comprises emulsifying styrol by agitating it with a soap forming fatty acid and aqueous ammonia, heating the resulting emulsion to polymerize the styrol into the vitreous polymer, and adding a liquid adapted to precipitate the polymerized styrol as a powder.

6. A process for making powdered vitreous polymerized styrol which comprises emulsifying styrol by agitating it with aqueous ammonia and a soap forming fatty acid, heating the resulting emulsion at 130° C.–175° C. for 90–10 hrs. to polymerize the styrol into the vitreous polymer, and adding an agent adapted to precipitate the polymerized styrol as a powder.

7. A process for making powdered vitreous polymerized styrol which comprises emulsifying styrol by agitating it with a water solution of ammonia and a soap forming fatty acid, heating the resulting emulsion to polymerize the styrol into the vitreous polymer, and adding a water soluble organic precipitant to the dispersion adapted to precipitate vitreous polymerized styrol as a powdery mass.

8. A process for making powdered vitreous polymerized styrol which comprises emulsifying styrol by stirring 10% aqueous solution of ammonia and 1–10% oleic acid thereinto, heating the resulting emulsion at 140° C. for 12–24 hrs. to polymerize the styrol, adding acetone to the dispersion to precipitate the polymerized styrol as a powder, and washing and drying the powder.

9. A step in the process of producing a powdered vitreous polymerized styrol which comprises emulsifying styrol with aqueous ammonia and a soap forming fatty acid, and heating the resulting emulsion.

10. A step in the process of producing a powdered vitreous polymerized styrol which comprises emulsifying styrol with aqueous ammonia and oleic acid, and heating the resulting emulsion at 140° C. for 12 to 24 hrs. to polymerize the styrol.

11. A step in the process of producing a powdered vitreous polymerized $ArCH:CH_2$ where Ar is aryl which comprises precipitating powdered polymerized ArCH:CH$_2$ from a dispersion thereof.

12. A step in the process of producing a powdered vitreous polymerized styrol which comprises polymerizing styrol in an emulsion containing a small amount of a soap forming fatty acid reaction product.

13. A step in the process of producing a powdered vitreous polymerized styrol which comprises precipitating powdered vitreous polymerized styrol from an emulsion containing a small amount of ammonium oleate.

14. As a new article powdered vitreous polymerized styrol precipitated from a dispersion thereof, and characterized by tough solid individual particles.

Signed at New York, New York, this 3rd day of May, 1924.

IWAN OSTROMISLENSKY.